(No Model.)
W. WALTER.
VACUUM PAN.
No. 499,486. Patented June 13, 1893.
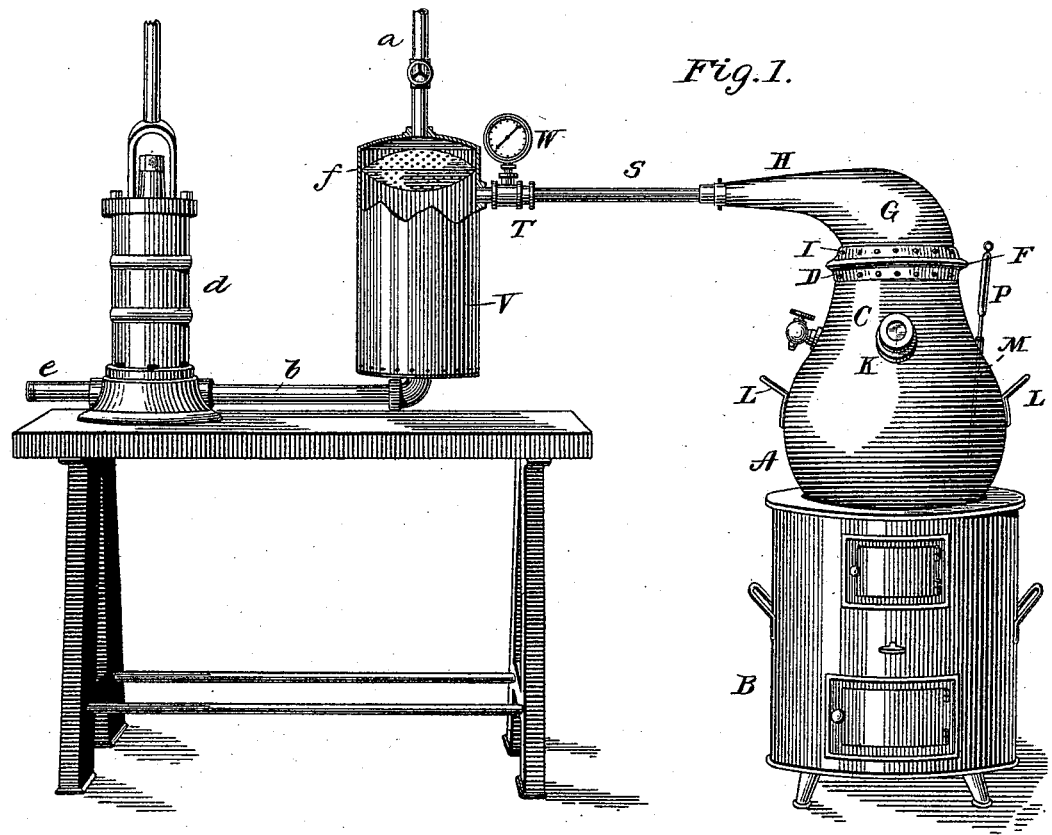
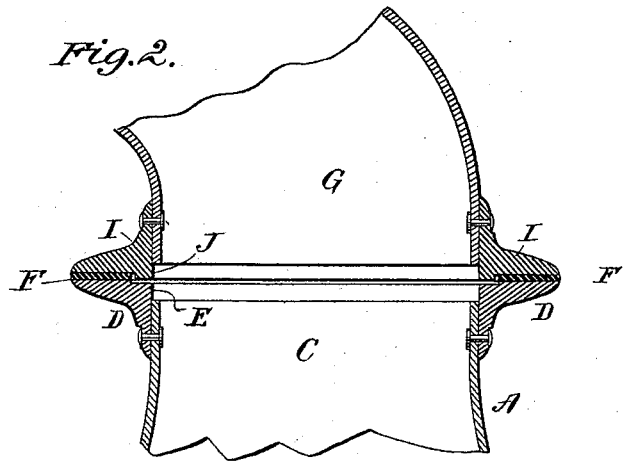
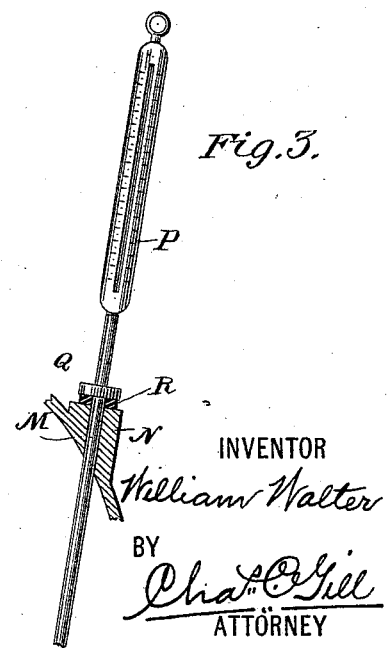
WITNESSES:
Frank S. Ober
Herman Gustow
INVENTOR
William Walter
BY
Chas. O. Gill
ATTORNEY

UNITED STATES PATENT OFFICE.

WILLIAM WALTER, OF NEW YORK, N. Y.

VACUUM-PAN.

SPECIFICATION forming part of Letters Patent No. 499,486, dated June 13, 1893.

Application filed November 21, 1892. Serial No. 452,648. (No model.)

*To all whom it may concern:*

Be it known that I, WILLIAM WALTER, a citizen of the United States, and a resident of New York, in the county of New York and State of New York, have invented certain new and useful Improvements in Vacuum-Pans, of which the following is a specification.

The invention relates to improvements in vacuum pans for use in the manufacture of candy, and consists in a pan or kettle adapted to be seated upon the open top of the usual stove and having a removable lid or cover which terminates at one side in a contracted nozzle, a condenser connected by a flexible tube with said nozzle, and a pump connected with said condenser, all as hereinafter more particularly described and claimed.

The invention further consists of certain details of construction hereinafter pointed out.

The invention has more particularly been designed to meet the want of persons whose manufacture of candy is not on a very extensive scale and in whose places of business it is not convenient to employ the well known large and expensive steam vacuum pans.

Referring to the accompanying drawings forming a part of this application: Figure 1 is a side elevation of an apparatus embodying my invention and shown in position for immediate use, the upper part of the condenser being in section. Fig. 2 is an enlarged vertical section through the upper portion of the pan or kettle and illustrating particularly the joint between the pan or kettle and its cover; and Fig. 3 is a detached vertical section showing the manner of applying the thermometer to the pan.

In the drawings A designates the copper pan or kettle having a rounded body and base and adapted to rest upon the open top of the customary stove B. The upper portion of the pan A is contracted, as shown, forming a neck C, to the upper edges of which is riveted the angle-flange D having at its inner edges the groove E and forming a seat for the gasket F. The pan or kettle A has a cover or cap G, which terminates at one side in the contracted nozzle H which is formed as an elongated collecting nozzle and is tapered toward and con50 tracted at its outer end where it receives the flexible connection, and has riveted to its lower circular edges the angle-flange I, the latter being similar in dimensions to the angle-flange D secured to the pan, and having a broad lower surface adapted to firmly bear upon the gasket F. The inner edge of the angle-flange I is provided with the annular shoulder J, which when the cover is placed in position on the pan will enter the groove E formed in the angle-flange D, and thus aid in securing the cover in place.

Upon the side of the pan or kettle A is provided a spy-hole having a transparent covering K, which will permit the contents of the pan to be inspected from time to time as required, without removing the cover G; and upon opposite sides of the pan are the handles L by which the pan may be conveniently lifted or moved. At one side of the pan or kettle A is an aperture M surrounded by a seat N and provided to receive the stem of the thermometer P, which freely passes downward into the pan, as indicated, and has a collar Q adapted to bear upon the gasket R resting on the seat N.

The contracted nozzle H formed on the cap or cover G is connected by a flexible tube S of suitable length with the nozzle T extending outward from the upper end of the condenser V and supporting the vacuum gage W. The condenser V is of sheet metal and cylindrical in form, and has at its upper end an inlet pipe *a* for cold water, while at its lower end there is provided a pipe *b* leading to the usual pump *d* having a discharge pipe *e* and adapted to be operated by hand or power. Within the upper portion of the condenser V is provided the hollow perforated sprayer *f*, which extends entirely across the condenser and upon which the water from the pipe *a* falls, the said water being thereby diffused and caused to pass through over part of the interior of the condenser for the purpose of effectually condensing the vapors therein.

In the use of the apparatus above described, the sugar being in the pan or kettle A and the cover or lid G in position, the pump *d* will be set in motion and the water allowed to enter the condenser V, the result being that the pump will maintain a vacuum in the pan or kettle A and draw the moisture generated therein into the condenser V, wherein the water will condense the same prior to its escape through the pipe *d* and discharge pipe

*e*. The operation of the pump *d* also has the effect of drawing the cover G close down against the gasket F, and the collar Q against the gasket R; thus forming air tight joints and firmly maintaining the cover and thermometer in position. As soon as the pump *d* has ceased to operate, the force of the vacuum will be relieved and the cover G may be readily removed. During the operation of boiling the sugar, the degree of heat may be readily observed on the thermometer P and the contents of the pan inspected through the spyhole K. When the candy has been formed, the thermometer P is withdrawn, the cover G removed and the pan A by means of the handles L lifted from the stove.

The flexible tube S will preferably be of rubber having a spirally-wound wire core, and it is of great convenience since it permits the cover G to be quickly placed upon or removed from the pan A whether the latter is resting evenly on the stove B or in a tilting position, or whether it is in line with the condenser and pump or removed therefrom. The flexible tube S will also permit the moving of the pan A within certain limits without breaking the connections or stopping the pump, and is further convenient in that it retains the cover G and permits the placing of the stove in the position most desired with relation to the condenser and pump.

The apparatus above described is simple in construction and operation and will meet the wants of manufacturers who would not need and probably could not purchase the large steam vacuum pans now on sale.

In addition to the advantages stated above, I obtain the direct heat of the fire on the pan A, and my experience has demonstrated that by the use of the invention I can boil the sugar at a higher degree of heat and produce a clearer and drier candy than seems practicable by any other apparatus known to me.

What I claim as my invention, and desire to secure by Letters Patent, is—

1. The vacuum pan or kettle having the rounded body and base and a contracted neck, and being adapted to be removably seated upon the open top of a stove, and the removable cover or lid for said pan terminating in the elongated tapered collecting nozzle combined with the condenser, the pump connected therewith, and the flexible tube extending from said nozzle to the condenser; substantially as set forth.

2. The vacuum pan or kettle having the rounded body and base and a contracted neck, and being adapted to be removably seated upon the open top of the ordinary candy maker's stove and the removable lid for said pan terminating in the elongated tapered collecting nozzle, combined with the flexible tube extending from said nozzle and means communicating with said tube for maintaining a vacuum in said pan, substantially as set forth.

Signed at New York, in the county of New York and State of New York, this 18th day of November, A. D. 1892.

WILLIAM WALTER.

Witnesses:
   CHAS. C. GILL,
   ED. D. MILLER.